(12) United States Patent
Noda

(10) Patent No.: US 7,630,453 B2
(45) Date of Patent: Dec. 8, 2009

(54) MULTI-LEVEL MODULATION METHOD AND SYSTEM

(75) Inventor: Seiichi Noda, Tokyo (JP)

(73) Assignee: NEC Corporation, Tokyo (JP)

( * ) Notice: Subject to any disclaimer, the term of this patent is extended or adjusted under 35 U.S.C. 154(b) by 695 days.

(21) Appl. No.: 11/073,584

(22) Filed: Mar. 8, 2005

(65) Prior Publication Data

US 2005/0201479 A1 Sep. 15, 2005

(30) Foreign Application Priority Data

Mar. 12, 2004 (JP) ............................. 2004-071554

(51) Int. Cl.
*H04L 27/00* (2006.01)
*H04L 27/36* (2006.01)
*H04L 27/20* (2006.01)

(52) U.S. Cl. ..................... 375/295; 375/298; 375/308

(58) Field of Classification Search ................ 375/261, 375/267, 286, 308, 237–239, 242, 259, 269, 375/279, 298, 377, 264; 341/56–58, 94, 341/106; 370/215, 335, 527; 455/21, 23, 455/42, 205, 337; 360/39–40; 332/112, 332/144; 714/778–779
See application file for complete search history.

(56) References Cited

U.S. PATENT DOCUMENTS

| | | | | |
|---|---|---|---|---|
| 3,866,147 A | * | 2/1975 | De Couvreur et al. ......... | 341/57 |
| 4,009,595 A | * | 3/1977 | Barnard et al. ................ | 62/300 |
| 4,092,595 A | * | 5/1978 | Weir et al. .................... | 375/286 |
| 4,123,710 A | * | 10/1978 | Stuart et al. .................. | 375/263 |
| 4,506,252 A | * | 3/1985 | Jacoby et al. ................. | 341/57 |
| 4,779,073 A | * | 10/1988 | Iketani ......................... | 341/55 |
| 5,168,509 A | * | 12/1992 | Nakamura et al. ........... | 375/286 |
| 5,363,319 A | * | 11/1994 | Okuda .......................... | 703/15 |
| 6,717,532 B2 | * | 4/2004 | Noda ............................ | 341/57 |

(Continued)

FOREIGN PATENT DOCUMENTS

JP H04-196945 A 7/1992

(Continued)

OTHER PUBLICATIONS

Noda et al., Optimum Binary to Symbol Coding for 6PSK and Bit Error Rate Performance, Mar. 11-15, 2007, Wireless Communications and Networking Conference, 2007 WCNC 2007, IEEE, pp. 509-513.*

(Continued)

*Primary Examiner*—Tesfaldet Bocure
*Assistant Examiner*—Lawrence B Williams
(74) *Attorney, Agent, or Firm*—Sughrue Mion, PLLC

(57) ABSTRACT

Disclosed is a method and a system for performing N-ary modulation in which bit errors may be reduced against symbol error. A binary signal, a bit length thereof being n, is associated with N-ary signals arranged in first and second phase planes respectively for transmission, wherein N is not a number belonging to powers of 2 but is a number belonging to a series beginning from 12 and sequentially doubled, that is, any one of 12, 24, 48, 96, . . . , and wherein n is such that, if the bit length n is 7, 9, 11, 13, . . . , the number N is 12, 24, 48, 96, . . . , respectively, two out of the n bits are allocated for identifying four quadrants of the first phase plane, two out of the remaining (n−2) bits are allocated for identifying four quadrants of the second phase plane. The binary signal of three out of the n bits is converted into two digits of ternary signals (T1, T2). The ternary signals are mapped to the first and second phase planes with rotational symmetry of 90° or with axial symmetry.

61 Claims, 6 Drawing Sheets

U.S. PATENT DOCUMENTS

| | | | |
|---|---|---|---|
| 6,996,189 B1 * | 2/2006 | Morejon et al. | 375/261 |
| 7,031,403 B2 * | 4/2006 | Noda | 375/308 |
| 7,167,110 B2 * | 1/2007 | Noda | 341/57 |
| 7,330,451 B2 * | 2/2008 | Noda | 370/335 |
| 2002/0099537 A1 * | 7/2002 | Tolhuizen et al. | 704/201 |
| 2003/0035496 A1 * | 2/2003 | Noda | 375/308 |
| 2003/0063688 A1 * | 4/2003 | Noda | 375/308 |
| 2006/0093046 A1 * | 5/2006 | Nakamura | 375/242 |

FOREIGN PATENT DOCUMENTS

| | | |
|---|---|---|
| JP | H04-196946 A | 7/1992 |
| JP | 2003-60724 A | 2/2003 |
| JP | 2003-134184 A | 5/2003 |
| JP | 2004-129013 A | 4/2004 |

OTHER PUBLICATIONS

Yoichi Saitoh, "Modulation/Demodulation of Digital Wireless Communication", Society of Electronics Information and Communication, Feb. 1996.

Seiichi Noda et al., "Performance and Applications of PSK Modulation Whose Number of Phases is not a Power of 2", ISITA2002, pp. 239-242, Oct. 2002.

ARIB-STD-28, Fourth Edition, Mar. 2002, pp. 34-47.

* cited by examiner

FIG. 1a

Mapping of $t_0, t_1$

| $(t_0, t_1)$ | $Q_1$ |
|---|---|
| (0, 0) | 0 |
| (0, 1) | 1 |
| (1, 1) | 2 |
| (1, 0) | 3 |

FIG. 1b

Mapping of $t_2, t_3$

| $(t_2, t_3)$ | $Q_2$ |
|---|---|
| (0, 0) | 0 |
| (0, 1) | 1 |
| (1, 1) | 2 |
| (1, 0) | 3 |

FIG. 1c

Mapping of $t_4, t_5, t_6$

| $(t_4, t_5, t_6)$ | $(T_1, T_2)$ |
|---|---|
| (0, 0, 0) | (0, 0) |
| (0, 0, 1) | (0, 1) |
| (0, 1, 0) | (0, 2) |
| (1, 1, 0) | (1, 0) |
| (1, 1, 1) | (1, 1) |
| (0, 1, 1) | (1, 2) |
| (1, 0, 0) | (2, 0) |
| (1, 0, 1) | (2, 1) |

$Q_i$: quarternary signal
$T_i$: ternary signal
$i$ :1; first phase plane, 2; second phase plane

FIG. 3a
Mapping of t0, t1

| (t0,t1) | Q1 |
|---|---|
| (0,0) | 0 |
| (0,1) | 1 |
| (1,1) | 2 |
| (1,0) | 3 |

FIG. 3b
Mapping of t2, t3

| (t2,t3) | Q2 |
|---|---|
| (0,0) | 0 |
| (0,1) | 1 |
| (1,1) | 2 |
| (1,0) | 3 |

FIG. 3c
Mapping of t6, t7, t8

| (t6, t7, t8) | (T1, T2) |
|---|---|
| (0,0,0) | (0,0) |
| (0,0,1) | (0,1) |
| (0,1,0) | (0,2) |
| (1,1,0) | (1,0) |
| (1,1,1) | (1,1) |
| (0,1,1) | (1,2) |
| (1,0,0) | (2,0) |
| (1,0,1) | (2,1) |

FIG. 3d
Mapping of t4

| t4 | B1 |
|---|---|
| 0 | 0 |
| 1 | 1 |

FIG. 3e
Mapping of t5

| t5 | B2 |
|---|---|
| 0 | 0 |
| 1 | 1 |

Q$_i$; quarternary signal
T$_i$; ternary signal
B$_i$; binary signal
i :1 ; first phase plane, 2; second phase plane

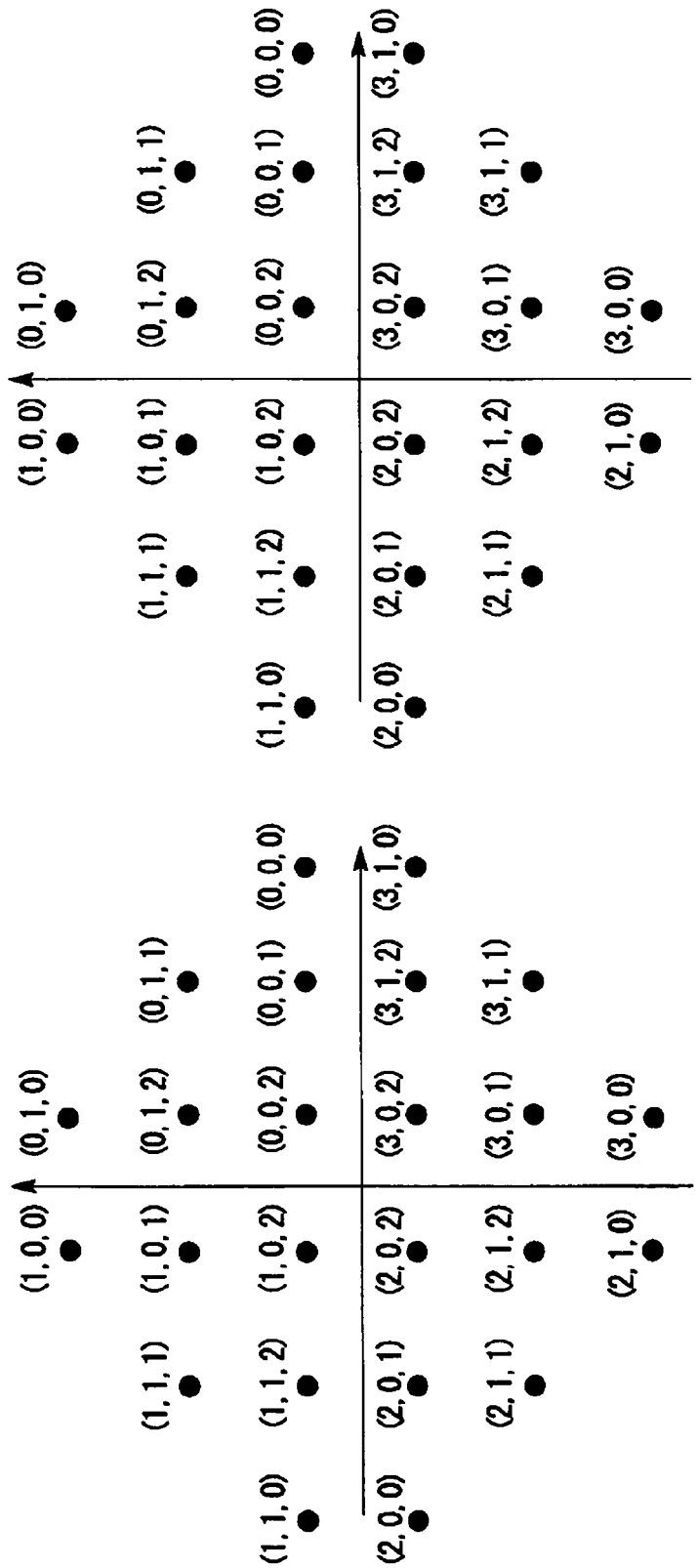

MULTI-LEVEL MODULATION METHOD AND SYSTEM

FIELD OF THE INVENTION

This invention relates to a method and a system for performing multi-level modulation.

BACKGROUND OF THE INVENTION

In the conventional N-ary modulation (N is $2^n$, where n is an integer more than 1) employed in wireless communication, including satellite communication, digital micro-wave communication or mobile communication, it is customary to use modulation, with the N-ary value of $2^n$, n being a positive integer. Examples of this type of modulation include QPSK (quadrature phase shift keying), 8PSK (8-phase shift keying), 16QAM (16-quadrature amplitude modulation) and 64QAM.

In general, the N-ary value of $2^n$ has been used by reason of circuit simplicity and compatibility with binary signal. However, with recent progress in the integrated circuit technology, implementation difficulties ascribable to complexity of the circuitry tend to be alleviated. On the other hand, the demand for more effective utilization of the frequency and the transmission power is increasing.

In order to meet the demand for more effective utilization of the frequency and the transmission power, $2^n$ phase modulation is generally used as a modulation technique (see for example the Non-Patent Publication 1 below).

As the technique relevant to the present invention, reference may be made to the Patent Publications, indicated below. For example, in the Patent Publication 1, shown below, there is shown a general configuration of the modulation system in which binary signal are allocated to plural phase planes, a non-integer number of transmission bits is used per symbol.

In the Patent Publication 2, shown below, there is shown a configuration of the modulating system in which binary signal are allocated to plural phase planes, a non-integer number of transmission bits may be used per symbol and in which the physical array of signal points in the respective phase planes is of rotational symmetry of 90°. This application simply shows an arrangement of the physical array of 90° rotational symmetry of the signal points, while there is not disclosed the technique as to how the binary signal are allocated to the 90° rotational symmetrical signal points.

In the Patent Publication 3, similarly shown below, there is disclosed an n-ary modulation system in which (2p+1) columns of data signals is converted into two (p+1) columns of signals, which are then allocated to two phase planes, time-divisionally multiplexed and subjected to multi-value modulation to allow taking the number of the multi-level values on the order of $2^{(p+0.5)}$. In the Patent Publication 4, shown below, there is disclosed an n-ary modulation system in which it is possible to take the number of the multi-level values on the order of $2^{(p+0.25)}$ or $2^{(p+q/n)}$.

[Patent Publication 1]
  JP Patent Kokai Publication JP-A-04-196945

[Patent Publication 2]
  JP Patent Kokai Publication JP-A-04-196946

[Patent Publication 3]
  JP Patent Kokai Publication JP-P2003-60724A

[Patent Publication 4]
  JP Patent Kokai Publication JP-P2003-134184A

[Non-Patent Publication 1]
  Yoichi Saitoh, 'Modulation/Demodulation of Digital Wireless Communication'. Published in February 1996 by Society of Electronics Information and Communication

[Non-Patent Publication 2]
  Noda, Nakamurand Koga, 'Performance and Applications of PSK Modulation whose number of phases is not a power of 2', ISITA2002, pp. 239-242, October 2002

[Non-Patent Publication 3]
  ARIB-STD-28, Fourth Edition, 2002.3

SUMMARY OF THE DISCLOSURE

The present inventor has found a novel n-ary modulation technique for a modulation system having a non-integer average number of transmission bits, for realization of the encoding which minimizes bit errors against symbol errors under the condition of using or not using e.g. the differential logic.

Accordingly, it is an object of the present invention to provide a method and a system for performing n-ary modulation for reducing the number of bit error against symbol errors.

The above and other objects are attained by the present invention having the following configuration.

In one aspect, the present invention provides an N-ary modulation method in which a binary signal, a bit length thereof being n, is associated with N-ary signals, in first and second phase planes respectively for transmission, wherein N is not a number belonging to powers of 2 but is a number belonging to a series beginning from 3 and sequentially doubled, that is, any one of 3, 6, 12, 24, 48, 96, . . . , and wherein n is such that, when n is 3, 5, 7, 9, 11, 13, . . . , the number N is 3, 6, 12, 24, 48, 96, . . . , respectively. The method comprises the step of associating, in allocating three bits, out of the n bits, of the binary signal to two ternary signals, the three-bit binary signal with the two digits of ternary signals so as to substantially minimize the average error rate of respective bits of the three-bit binary signal against all errors with the Lee distance of 1 of the two digits of ternary signals.

In another aspect, the present invention provides an N-ary modulation method in which a binary signal, a bit length thereof being n, is associated with N-ary signals arranged in first and second phase planes respectively for transmission, wherein N is not a number belonging to powers of 2 but is a number belonging to a series beginning from 12 and sequentially doubled, that is, any one of 12, 24, 48, 96, . . . , and wherein n is such that, if the bit length n is 7, 9, 11, 13, . . . , the number N is 12, 24, 48, 96, . . . , respectively. The method comprises the steps of:

(A1) converting the binary signal of three bits, out of the n bits, into two digits of ternary signals; and (A2) mapping the two digits of ternary signals with rotational symmetry of 90° to the first and second phase planes.

According to the present invention, the ternary signals in the above step (A2) may be mapped with axial symmetry to the first and second phase planes.

The method of the present invention comprises (B1) a step of setting two out of the n bits for identifying the four quadrants of the first phase plane, and (B2) a step of setting two out of the (n−2) bits for identifying the four quadrants of the second phase plane.

In a further aspect, the present invention provides an N-ary modulation method in which a binary signal, a bit length thereof being n, is associated with N-ary signals arranged in first and second phase planes respectively for transmission, wherein N is not a number belonging to powers of 2 but is a number belonging to a series beginning from 5 and sequentially doubled, that is, any one of 5, 10, 20, 40, 80, . . . , and wherein n is such that, when n is 9, 13, 17, 21, 25, the number N is 5, 10, 20, 40, 80, . . . , respectively. The method comprises the step of associating, in allocating nine bits, out of the n bits, of the binary signal to four digits of 5-ary signals, the nine-bit binary signal with the four digits of 5-ary signals so as to substantially minimize the average error rate of respective bits of nine-bit binary signal against all errors with the Lee distance of 1 of the four digits of 5-ary signals.

In a further aspect, the present invention also provides an N-ary modulation method in which a binary signal, a bit length thereof being n, is associated with N-ary signals arranged in four phase planes respectively for transmission, wherein N is not a number belonging to powers of 2 but is a number belonging to a series beginning from 20 and sequentially doubled, that is, any one of 20, 40, 80, 160, . . . , and wherein n is such that, when n is 17, 21, 25, 29, . . . , the number N is 20, 40, 80, 160, . . . , respectively. The method comprises the steps of:

(A1) converting the binary signal of nine bits, out of the n bits, into four digits of 5-ary signals; and (A2) mapping the four digits of 5-ary signals with rotational symmetry of 90° to the first to fourth phase planes.

According to the present invention, the 5-ary signals may be mapped in the above step (A2) with axial symmetry to the first to fourth phase planes.

The method of the present invention further comprises the steps of:

(B1) allocating two of the n bits for identifying four quadrants of the first phase plane;

(B2) allocating two of the remaining (n−2) bits for identifying four quadrants of the second phase plane;

(B3) allocating two of the remaining (n−4) bits for identifying four quadrants of the third phase plane; and (B4) allocating two of the remaining (n−6) bits for identifying four quadrants of the fourth phase plane.

In a further aspect, the present invention provides an N-ary modulation method in which a binary signal, a bit length thereof being n, is associated with N-ary signals arranged in three phase planes respectively for transmission, wherein N is not a number belonging to powers of 2 but is a number belonging to a series beginning from 7 and sequentially doubled, that is, any one of 7, 14, 28, 56, 112, 224, and wherein n is such that, when n is 8, 11, 14, 17, 20, 23, . . . , the number N is, 7, 14, 28, 56, 112, 224, . . . , respectively. The method comprises the step of associating, in allocating eight bits, out of the n bits, of the binary signal, to three digits of 7-ary signals, the eight-bit binary signal with the three digits of 7-ary signals so as to substantially minimize the average error rate of respective bits of eight-bit binary signal against all errors with the Lee distance of 1 of the three digits of 7-ary signals.

In a further aspect, the present invention provides an N-ary modulation method in which a binary signal, a bit length thereof being n, is associated with N-ary signals arranged in three phase planes respectively for transmission, wherein N is not a number belonging to powers of 2 but is a number belonging to a series beginning from 28 and sequentially doubled, that is, any one of 28, 56, 112, 224, . . . , and wherein n is such that, when n is 14, 17, 20, 23, . . . , the number N is 28, 56, 112, 224, . . . , respectively. The method comprises the steps of:

(A1) converting the binary signal of eight bits, out of the n bits, into three digits of 7-ary signals; and (A2) mapping the 7-ary signals with rotational symmetry of 90° to the first, second and third phase planes.

According to the present invention, the 7-ary signals may be mapped in the above step (A2) with axial symmetry to the first to third phase planes.

The method of the present invention further comprises the steps of:

(B1) allocating two of the n bits for identifying four quadrants of the first phase plane;

(B2) allocating two of the remaining (n−2) bits for identifying four quadrants of the second phase plane; and (B3) allocating two of the remaining (n−4) bits for identifying four quadrants of the third phase plane.

In a further aspect, the present invention provides an N-ary modulation method in which a binary signal, a bit length thereof being n, is associated with N-ary signals arranged in first, second and third phase planes respectively for transmission, wherein N is not a number belonging to powers of 2 but is a number belonging to a series beginning from 11 and sequentially doubled, that is, any one of 11, 22, 44, 88, 176, 352, . . . , and wherein n is such that, if the bit length n is 10, 13, 16, 19, 22, 25, . . . , the number N is 11, 22, 44, 88, 176, 352, . . . , respectively. The method comprises the step of associating, in allocating ten bits, out of the n bits, of the binary signal to three digits of 11-ary signals, the ten-bit binary signal with the three digits of 11-ary signals so as to substantially minimize the average error rate of respective bits of ten-bit binary signal against all errors with the Lee distance of 1 of the three digits of 11-ary signals.

In a further aspect, the present invention provides an N-ary modulation method in which a binary signal, a bit length thereof being n, is associated with N-ary signals arranged in three phase planes respectively for transmission, wherein N is not a number belonging to powers of 2 but is a number belonging to a series beginning from 11 and sequentially doubled, that is, any one of 11, 22, 44, 88, 176, 352, . . . and wherein n is such that, if the bit length n is 10, 13, 16, 19, 22, 25, . . . , the number N is 11, 22, 44, 88, 176, 352, . . . , respectively. The method comprises (A1) a step of converting binary signal of ten bits, out of the ten bits, to three digits of 11-ary signals, and (A2) a step of mapping the 11-ary signals with rotational symmetry of 90° to the first, second and third phase planes.

According to the present invention, the 11-ary signals may be mapped in the above step (A2) with axial symmetry to the first to third phase planes.

The method of the present invention further comprises the steps of:

(B1) allocating two of the n bits for identifying four quadrants of the first phase plane;

(B2) allocating two of the remaining (n−2) bits for identifying four quadrants of the second phase plane; and (B3) allocating two of the remaining (n−4) bits for identifying four quadrants of the third phase plane.

In a further aspect, the present invention provides an N-ary modulation method in which a binary signal, a bit length thereof being n, is associated with N-ary signals arranged in first, second, third and fourth phase planes respectively for transmission, wherein N is not a number belonging to powers of 2 but is a number belonging to a series beginning from 15 and sequentially doubled, that is, any one of 15, 30, 60, 120, 240, 480, . . . , and wherein n is such that, if the bit length n is 15, 19, 23, 27, 31, 35, . . . , the number N is 15, 30, 60, 120, 240, 480, respectively. The method comprises the step of associating, in allocating 15 bits, out of the n bits, of the binary signal to four digits of 15-ary signals, the 15-bit binary signal with the four digits of 15-ary signals so as to substantially minimize the average error rate of respective bits of 15-bit binary signal against all errors with the Lee distance of 1 of the four digits of 15-ary signals.

In a further aspect, the present invention provides an N-ary modulation method in which a binary signal, a bit length thereof being n, is associated with N-ary signals arranged in first, second, third and fourth phase planes respectively for transmission, wherein N is not a number belonging to powers of 2 but is a number belonging to a series beginning from 60 and sequentially doubled, that is, any one of 60, 120, 240, 480, . . . , and wherein n is such that, when n is 23, 27, 31, 35, the number N is 60, 120, 240, 480, . . . , respectively. The method comprises the steps of:

(A1) converting the binary signal of 15 bits, out of the n bits, into four digits of 15-ary signals; and
(A2) mapping the four digits of 15-ary signals with rotational symmetry of 90° to the first to fourth phase planes.

According to the present invention, the 15-ary signals may be mapped in the above step (A2) with axial symmetry to the first to fourth phase planes.

The method of the present invention further comprises the steps of:

allocating two of the n bits for identifying four quadrants of the first phase plane;
allocating two of the remaining (n−2) bits for identifying four quadrants of the second phase plane;
allocating two of the remaining (n−4) bits for identifying four quadrants of the third phase plane; and
allocating two of the remaining (n−6) bits for identifying four quadrants of the fourth phase plane.

The meritorious effects of the present invention are summarized as follows.

According to the present invention, such encoding may be implemented which minimizes bit errors against symbol errors.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIGS. 1a to 1c illustrate a first embodiment of the present invention.

FIGS. 3a to 3e illustrate a second embodiment of the present invention.

FIGS. 4a and 4b illustrate the second embodiment of the present invention.

PREFERRED EMBODIMENTS OF THE INVENTION

Figure 2A:
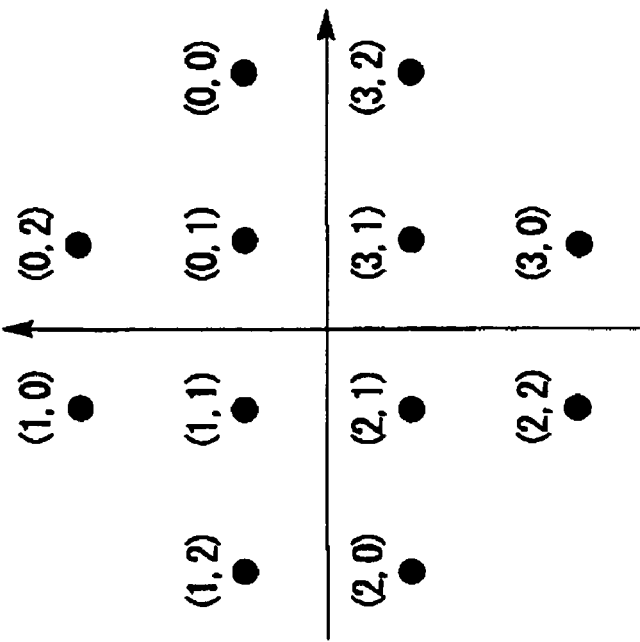
FIGS. 2a and 2b illustrate the first embodiment of the present invention.
Figure 2B:
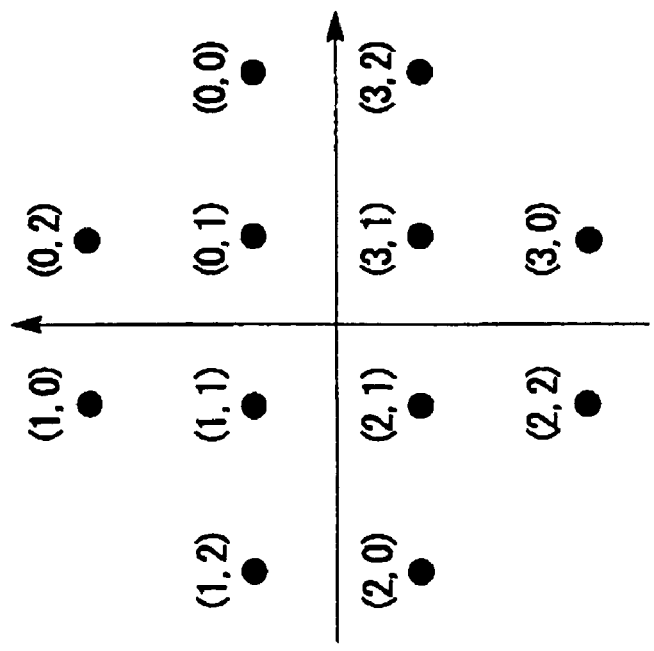

Referring to the drawings, certain preferred embodiments of the present invention are explained in detail.

An N-ary modulation method in accordance with a first embodiment of the present invention, in which a binary signal with a specified bit length n, is associated with N-ary signals arranged in first and second phase planes, N being not a number belonging to powers of 2, such as 4, 16, 64 or 256, but being a number such as 12, 24, 48 or 96, and n being such that, when n is 7, 9, 11, 13, . . . , the number N is 12, 24, 48 or 96, . . . , respectively, in which the method comprises the steps of:

allocating two of the n bits for identifying four quadrants of the first phase plane;
allocating two of the remaining (n−2) bits for identifying four quadrants of the second phase plane; and
allocating two of the remaining (n−4) bits for identifying four quadrants of the third phase plane.

According to the present invention, in allocating three of the (n−4) bits to two digits of ternary signals, in mapping the (n−4) bits to two digits of ternary signals to the first and second phase planes with rotational symmetry of 90°, the binary signal with the length 3 (bit length of 3) is associated with the ternary signals with the length of 2, in such a manner that the average error rate of the respective bits of the binary signal with the length of 3 will be apparatus minimum against the totality of errors with the Lee distance of 1 of the two digits of ternary signals.

In an embodiment of the present invention, in associating three-bit binary signal to two digits of ternary signals, arranged in four quadrants of each of two phase planes, the three-bit binary signal of (0,0,0), (0,0,1), (0,1,1), (1,1,0), (1,1,1), (0,1,0), (1,0,0) and (1,0,1) are allocated to two digits of ternary signals of (0,0), (0,1), (0,2), (1,0), (1,1), (1,2), (2,0) and (2,1). It is noted that (0,0,0), (0,0,1), (0,1,0), (1,1,0), (1,1,1), (0,1,1), (1,0,0) and (1,0,1), (0,0,0), (0,1,1), (0,0,1), (1,0,0), (1,1,1), (1,0,1), (0,1,0) and (1,1,1) or (0,0,0), (0,1,1), (0,0,1), (1,0,0), (1,1,1), (1,0,1), (1,1,0) and (0,1,0) may be allocated in place of the three-bit binary signal of (0,0,0), (0,0,1), (0,1,1), (1,1,0), (1,1,1), (0,1,0), (1,0,0) and (1,0,1).

In an embodiment of the present invention, in correlating binary signal with a length 3 with ternary signals with a length 2, of ternary signals placed in the four quadrants of two phase planes, more specifically, in allocating three-bit binary signal to two digits of ternary signals (0,0), (0,1), (0,2), (1,0), (1,1), (1,2), (2,0) and (2,1), the totality of the three-bit binary signal $(b_2, b_1, b_0)$ are added by $(v_2, v_1, v_0)$, where $v_2$, $v_1$ and $v_0$ are 0 or 1, to give $(b_2+v_2, b_1+v_1, b_0+v_0)$, as binary signal, with the length of 3, which are then allocated to the two digits of ternary signals. Or, the bits $b_2$, $b_1$ and $b_0$ may be interchanged in the bit sequence and allocated in this sequence interchanged state to the two digits of ternary signals.

In an embodiment of the present invention, in correlating binary signal with the length 3 with ternary signals with a length 2, of ternary signals placed in the four quadrants of two phase planes, more specifically, in allocating three-bit binary signal to two digits of ternary signals (0,0), (0,1), (0,2), (1,0), (1,1), (1,2), (2,0) and (2,1), the totality of the three-bit binary signal $(b_2, b_1, b_0)$ are added by $(v_2, v_1, v_0)$, with e.g. $v_{2=0}$, $v_1=0$ and $v_0=1$, to give $(b_2+v_2, b_1+v_1, b_0+v_0)$, as three-bit binary signal (0,0,1), (0,0,0), (0,1,0), (1,1,1), (1,1,0), (0,1,1), (1,0,1), (1,0,0), which are then allocated to the two digits of ternary signals. In the following, preferred embodiments of the invention are explained.

FIGS. 1a to 1c illustrate the encoding for mapping binary signal with a length of 7 (7 bits), in the 12QAM modulation system, as an embodiment of the present invention, on two phase planes.

In the 12QAM, 7-bit signals of t0, t1, t2, t3, t4, t5, t6 and t7 are divided into three groups (t0, t1), (t2, t3) and (t4 t5, t6).

The bit groups (t0, t1), (t2, t3) and (t4 t5, t6) are associated with Q1, Q2 and (T1, T2), respectively.

In FIGS. 1a and 1b, Q1 and Q2 are associated with quadrant signals of the first and second phase planes and are quaternary (four values of 0, 1, 2 and 3), and are Gray-coded. In the example shown in FIGS. 1 and 1b, the four values of 0, 1, 2 and 3 are associated so that (t0, t1)=(0,0), (0,1), (1,1) and (1,0).

In FIGS. 1a and 1b, T1 and T2 denote intra-quadrant signals of the first and second phase planes, and are ternary signals (signals of three values of 0, 1 and 2). T1 and T2 are encoded so as to be correlated with each other in the two phase planes, such that the number of errors of the binary signal against errors of the ternary signals will be minimized. A method for associating ternary signals with a length of 2, that is, (0,0), (0,1), (0,2), (1,0), (1,1), (1,2), (2,0) and (2,1) with binary signal with a length 3, that is, (0,0,0), (0,0,1), (0,1,0), (1,1,0), (1,1,1), (0,1,1), (1,0,0) and (1,0,1), so that an average error rate of the respective bits of the binary signal with the length 3 against the errors of all Lee distances 1 of the ternary signals with the length 2 will be decreased or minimized, has been described in the specification 1 of the senior application by the present inventors (Patent Application No. 2002/291935: now published JP Patent Kokai Publication JP-P2004-129013A).

In the present embodiment, if, in connection with ternary signals arranged in each of the four quadrants of the two phase planes, the binary signal with the length 3 is associated with ternary signals with the length 2, more specifically, the binary signal with the length 3 is allocated to the ternary signals with the length 2, that is, (0,0), (0,1), (0,2), (1,0), (1,1), (1,2), (2,0) and (2,1), the totality of the above signals $b_2$, $b_1$, $b_0$ may be added by ($v_2$, $v_1$, $v_0$), where $v_2$, $v_1$ and $v_0$ are 0 or 1, and thereby converted to (b2+v2, b1+v1, b0+v0), as binary signal with a length 3, which are then allocated to the length 2 ternary signals.

In the present embodiment, the bits $b_2$, $b_1$ and $b_0$ may be interchanged in the bit sequence and allocated in this sequence interchanged state to the length 2 ternary signals.

FIGS. 2a and 3b show mapping to the phase planes of the signal, encoded to four ary and three ary values shown in FIGS. 1a to 1c.

Specifically, two bits (t0, t1), out of seven bits, are allocated for identifying four quadrants of the first phase plane, two bits (t2, t3), out of the remaining five bits, are allocated for identifying four quadrants of the second phase plane and the remaining three-bits (t4, t5, t6) are mapped to signals T1 and T2, arranged with rotation symmetry of 90° in the first and second phase planes. In the first quadrant of the first phase plane of FIG. 2a, the quaternary signal Q1 is 0, while the ternary signal T1 is placed 1, 0 and 2 counterclockwise from the point of origin side. In the second quadrant, the quaternary signal Q1 is 1, while the ternary signal T1 corresponds to the placement of the first quadrant, rotated 90° counterclockwise. In the third quadrant, the quaternary signal Q1 is 2, while the ternary signal T1 corresponds to the array of the second quadrant, rotated 90° counterclockwise. In the fourth quadrant, the quaternary signal Q1 is 3, while the ternary signal T1 corresponds to the array of the third quadrant, rotated 90° counterclockwise (or to the placement of the first quadrant, rotated 90° clockwise).

Figure 5:
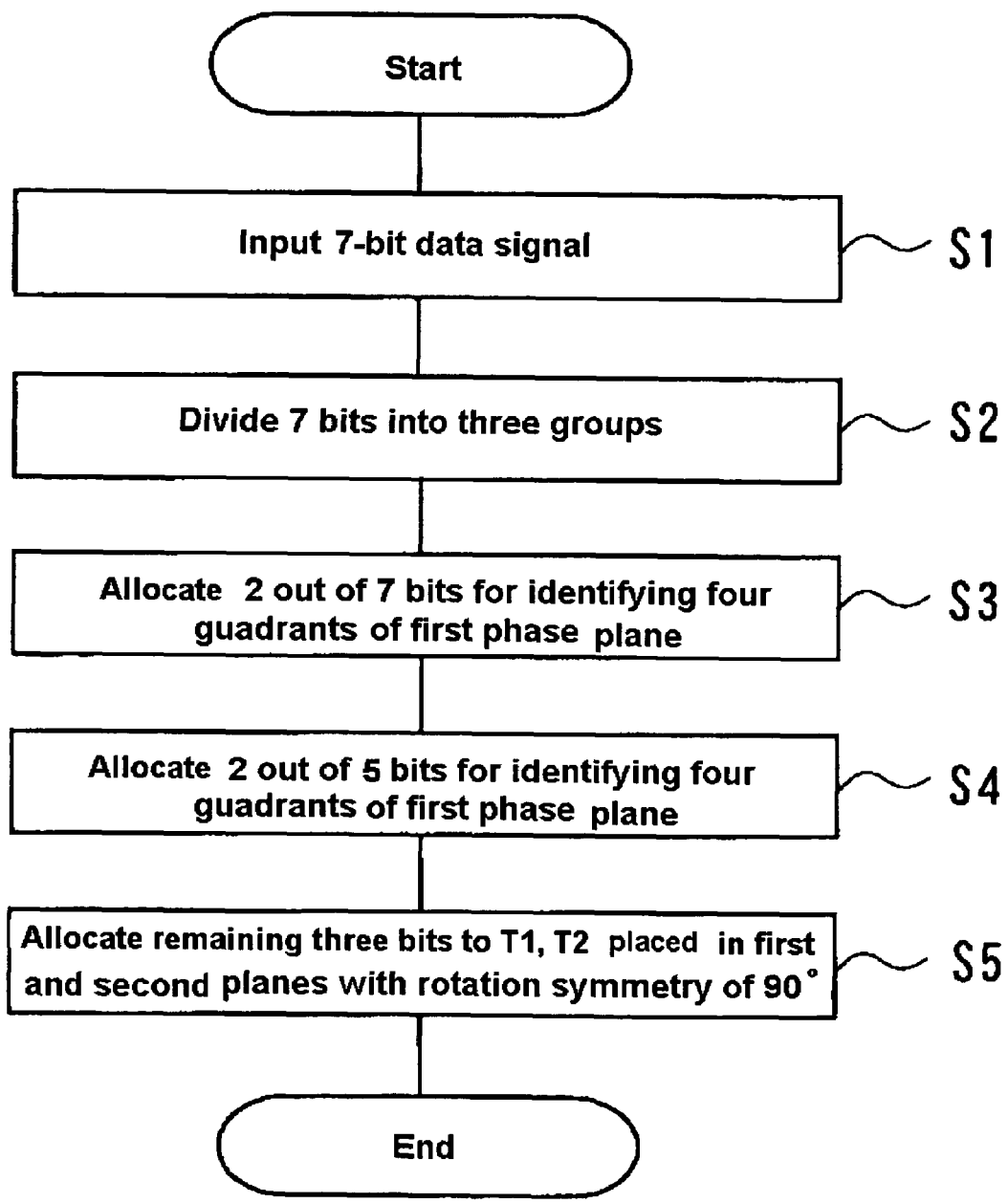
FIG. 5 is a flowchart for illustrating the first embodiment of the present invention.

The operation of the present embodiment is now explained. FIG. 5 is a flowchart for illustrating the operation of an embodiment of the present invention.

First, in the N-ary modulating method according to the present embodiment, 7-bit data signals are entered (step S1) and the seven bits entered are divided into three groups (FIG. 1a).

In a step S3, two bits out of the seven bits are associated with a signal Q1 for identifying the four quadrants of the first phase plane (FIG. 1a).

In a step S4, the two bits out of the remaining five bits are associated with a signal Q2 for identifying the four quadrants of the second phase plane (FIG. 1b).

In a step S5, the remaining three bits are mapped to signals T1 and T2, arranged with rotation symmetry of 90° in the first and second phase planes.

The two digits of ternary signals T1 and T2 are encoded with correlation in the first and second phase planes. Specifically, the signals T1 and T2 are encoded in a manner so as to minimize the number of errors of the binary signal with respect to errors of the ternary signal. As for the encoding minimizing this error, reference is made to the aforementioned Non-Patent Publication 2 and the specification 1 of the senior application by the present inventors (Patent Application No. 2002-291935: now published JP Patent Kokai Publication JP-P2004-129013A).

Thus, according to the present invention, the two bits out of the length n bits are allocated for identifying the four quadrants of the first phase plane, the two bits out of the remaining (n−2) bits are allocated for identifying the four quadrants of the second phase plane and the remaining (n−4) bits are mapped with rotation symmetry of 90° in the first and second phase planes. Hence, by adopting a differential logic, signal transmission becomes possible without dependency on phase uncertainty of the reproduction carrier and, in addition, the bit errors may be minimized with advantage relative to symbol error.

As compared to the case of the Non-Patent Publication 3 (ARIB-STD-28, Fourth Edition, 2002.3), the mapping, described above, is superior by approximately 0.4 dB in $10^{-3}$ points in terms of the bit error rate, in case comparison is made of the conditions under which differential encoding cannot be applied due to the axially symmetrical arrangement of the binary information. Moreover, the mapping of the present invention, in which the differential logic is applied, has an outstanding effect that error rate characteristics of the binary information may be realized, which are approximately comparable to the characteristics of the Non-Patent Publication 3 in which the differential logic is not applied.

For values of the powers of 2, such as QPSK or 8PSK, Gray codes are well-known as an encoding system for minimizing bit errors against symbol errors. The present invention provides a system for minimizing the bit error for symbols which are not powers of 2, such as 12, 24, 48 or 96.

Figure 6A:
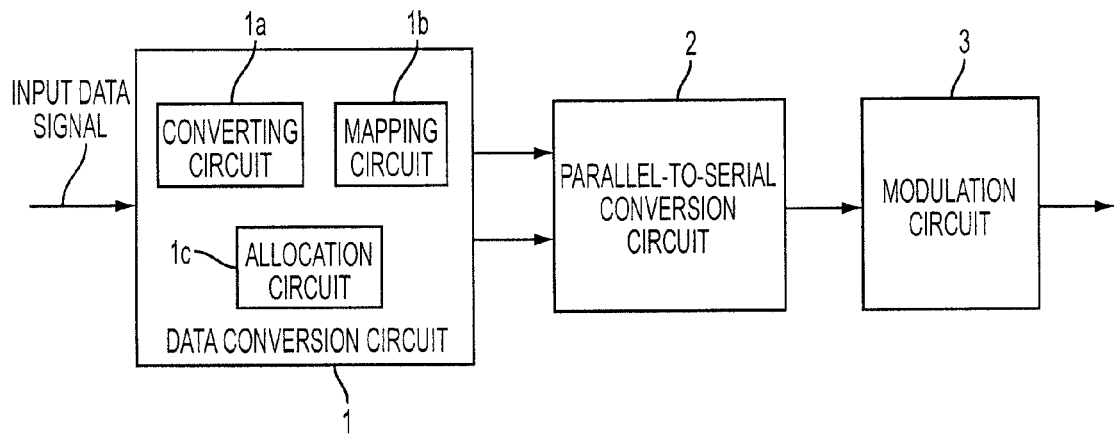
FIGS. 6a and 6b illustrate the configuration of the N-ary modulation system and demodulating system embodying the present invention.
Figure 6B:
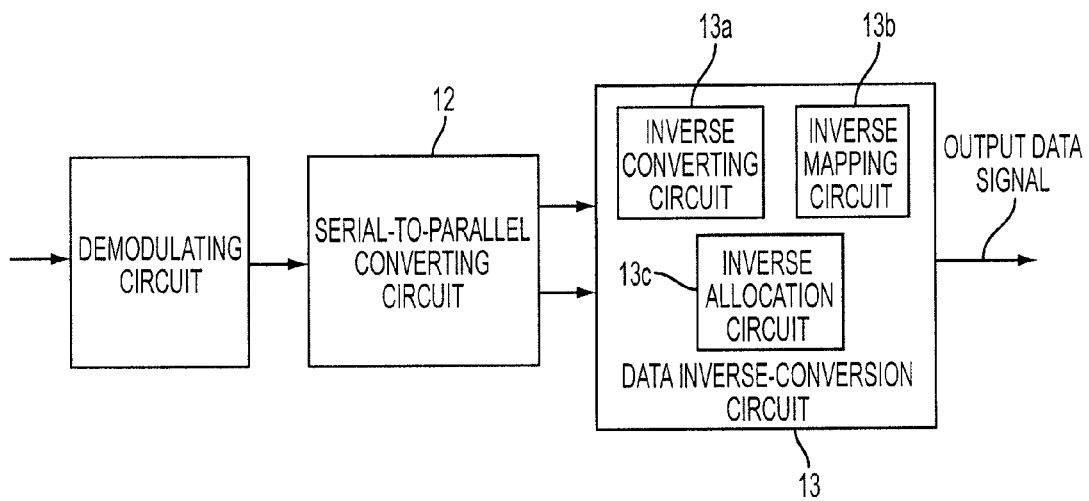

FIGS. 6a and 6b show the configuration of a transmitting device and a receiving device of an N-ary modulation/demodulation system according to an embodiment of the present invention. Referring to FIG. 6a, showing a transmitting device, a data conversion circuit 1, which is supplied with seven-bit input data (t0 to t6), subdivides the bits into three groups of (t0, t1), (t2, t3) and maps these groups into two four-ary signals Q1 and Q2 and two digits of ternary signals T1 and T2 using converting circuit 1a. Of these, the two digits of ternary signals T1 and T2 are mapped to the first and second phase planes with rotational symmetry of 90° using mapping circuit 1b. Allocation circuit 1c allocates at least one bit of the seven-bit input data to identify quadrants of the first and second phase planes. The data conversion circuit outputs symbols associated with the first phase plane and with the second phase plane, performs parallel-to-serial conversion in a parallel-to-serial conversion circuit 2 and performs N-ary modulation (12QAM) in a modulation circuit 3. Referring to FIG. 6b, showing a receiving device, a demodulating circuit 11 performs N-ary demodulation on received signals and sequentially outputs demodulated symbols. A serial-to-parallel conversion circuit 12 converts serially input demodulated symbols into parallel data, which are supplied to a data inverse-conversion circuit 13. The data inverse-conversion circuit 13 performs an operation which corresponds to the reverse operation of the conversion performed by the data conversion circuit 1, using inverse converting circuit 13a, inverse mapping circuit 13b, and inverse allocation circuit 13c. That is, the data inverse-conversion circuit derives (t0, t1), (t2, t3) and (t4, t5, t6) from (Q1, T1) and (Q2, T2) of the first and second phase planes to output serial bit data (t0 to t6).

As a second embodiment of the present invention, the encoding of 9-bit binary signal, in case of application to 24QAM, is shown in FIGS. 3a and 3b. FIGS. 4a and 4b shows an embodiment of mapping the codes shown in FIGS. 3a and 3b to two phase planes.

With 24QAM, 9-bit signals of t0, t1, t2, t3, t4, t5, t6, t7 and t8 are sub-divided into three groups (t0, t1), (t2, t3), t4, t5 and (t6, t7, t8). (t0, t1) is associated with Q1, (t2, t3) is associated with Q2, t4 is associated with B1, t5 is associated with B2 and (t6, t7, t8) is associated with (T1, T2).

Q1 and Q2, are associated with quadrant signals of the first and second phase planes, four-ary, and are Gray-coded.

B1 and B2 are associated with the intra-quadrant signals of the first and second phase planes and are binary.

T1 and T2 represent intra-quadrant signals of the first and second phase planes and are ternary. T1 and T2, undergo encoding which has correlation in the two phase planes, and are encoded in such a fashion that the number of errors of the binary signal will be minimum against errors of the ternary signal.

Referring to FIGS. 4a and 4b, two out of the nine bits are allocated for identifying the four quadrants of the first phase plane, two bits out of the remaining seven bits are allocated for identifying the four quadrants of the second phase plane, one bit out of the remaining five bits is allocated for identifying the four quadrants of the first phase plane, and the remaining three bits are mapped to the first and second phase planes with rotational symmetry of 90°. (T1, B1, Q1) are mapped to the first phase plane and (T2, B2, Q2) are mapped to the second phase plane. Similarly to the system of the previous embodiment, the N-ary modulation system is made up of the transmission apparatus and the receiving apparatus, shown in FIGS. 6a and 6b, respectively.

Meanwhile, in the above-described first embodiment, the three-bit binary signal (t4, t5, t6) is mapped to the two digits of ternary signals (T1, T2), the ternary signals (T1, T2) are arranged in the quadrants and are arranged in the first and second phase planes with rotational symmetry. However, the manner of mapping in the present embodiment is not limited to 90° rotational symmetry of 90°.

For example, the three-bit binary signal (t4, t5, t6) may be arranged within the quadrants in the first and second phase planes with axial symmetry. Thus, as for the ternary signals T1, in the first phase plane of FIG. 2a, the first quadrant and the second quadrant may be arranged with axial symmetry (about the Y-axis, that is, the Q-axis), whilst the fourth and third quadrants may be arranged similarly with axial symmetry. For example, (1,0) is arranged in the second quadrant with axial symmetry with respect to (Q1, T1)=(0,0) in the first quadrant, whilst (1,2) is arranged in the second quadrant with axial symmetry with respect to (Q1, T1)=(0,2) in the first quadrant. Of course, (1,0) and (1,2) may be arranged with axial symmetry with respect to the X-axis (I-axis) on the phase plane (plane in which to array signal points of the modulated wave).

In case of mapping to axial symmetry, the differential logic may not be applied. However, the error rate characteristics may be improved by, for example, approximately 0.4 dB. The same may be said of the above-described second embodiment.

In the above embodiments, such a method for correlating three-bit binary signal with two digits of ternary signals so as to substantially minimize the average error rate of the respective bits of the binary signal of three out of n bits, with respect to the totality of errors of the Lee distance of 1 of the two digits of ternary signals, in connection with allocation of the three-bit binary signal to the two digits of ternary signals, taking the case of the N-ary number, N being 12 and 24 (12QAM and 24QAM) as an example. However, the present invention is not limited to the above-described configuration, as hereinafter explained.

A third embodiment of the present invention is directed to an N-ary modulation method in which a binary signal, a bit length thereof being n, is associated with N-ary signals arranged in first and second phase planes respectively for transmission, wherein N is not a number belonging to powers of 2 but is a number belonging to a series beginning from 3 and sequentially doubled, that is, any one of 3, 6, 12, 24, 48, 96, . . . , and wherein n is such that, when n is 3, 5, 7, 9, 11, 13, . . . , the number N is 3, 6, 12, 24, 48, 96, . . . , respectively, wherein, in allocating three bits, out of the n bits, of the binary signal to two digits of ternary signals, the three-bit binary signal is associated with the two digits of ternary signals so as to substantially minimize the average error rate of respective bits of the three-bit binary signal against all errors with the Lee distance of 1 of the two digits of ternary signals. It is noted that the case of N=12, 24 and n=7, 9 corresponds to the above-described first and second embodiments.

Out of the above n bits, three bits of the binary signal is converted into two digits of ternary signals, and the resultant ternary signals are mapped to the first and second phase planes with rotational symmetry of 90° (the case of N=12, 24 with n=7, 9 corresponds to the above-described first and second embodiments).

In addition, in the third embodiment of the present invention, two out of the n bits are allocated for identifying the four quadrants of the first phase plane, and two out of the remaining (n−2) bits are allocated for identifying the four quadrants of the second phase plane.

In a modification of the third embodiment of the present invention, ternary signals may be mapped to the first and second phase planes with axial symmetry.

A fourth embodiment of the present invention is directed to an N-ary modulation method in which a binary signal, a bit length thereof being n, is associated with N-ary signals arranged in four phase planes, N being not a number belonging to powers of 2, but being a number such as 5, 10, 20, 40, 80, . . . , and n being such that, when n is 9, 13, 17, 21, 25, 29, . . . , the number N is 10, 20, 40, 80, . . . , respectively, wherein binary signal of nine bits (t0 to t8) out of the n bits are allocated to the four digits of 5-ary signals (F1, F2, F3, F4) so as to substantially minimize the average error rate of the respective bits of the 9-bit binary signal against the totality of errors with the Lee distance of 1 of the four digits of 5-ary signals.

A fifth embodiment of the present invention is directed to an N-ary modulation method in which a binary signal, a bit length thereof being n, is associated with N-ary signals arranged in four phase planes, N being not a number belonging to powers of 2, such as 4, 16, 64, 256, . . . but being a number such as 20, 40, 80, 160, . . . , and n being such that, when n is 9, 13, 17, 21, 25, 29, . . . , the number N is 20, 40, 80, 160, . . . respectively, wherein the binary signal of nine bits out of the n bits is converted into four digits of 5-ary signals and the four-ary 5-ary signals are mapped with 90° rotational symmetry of 90° to the first, second, third and fourth phase planes. As a modification of the fifth embodiment of the present invention, the four digits of 5-ary signals may be mapped with axial symmetry to the first, second, third and fourth phase planes.

In a fifth embodiment of the present invention, two out of the above n bits are allocated for identifying the four quadrants of the first phase plane, two out of the remaining (n−2) bits are allocated for identifying the four quadrants of the second phase plane, two out of the remaining (n−4) bits are allocated for identifying the four quadrants of the third phase plane, and two out of the remaining (n−6) bits are allocated for identifying the four quadrants of the fourth phase plane.

A sixth embodiment of the present invention is directed to an N-ary modulation method in which a binary signal, a bit length thereof being n, is associated with N-ary signals arranged in four phase planes, N being not a number belonging to powers of 2, such as 4, 16, 64, 256, . . . but being a number such as 7, 14, 28, 56, 112, 224, . . . , and n being such that, when n is 8, 11, 14, 17, 20, 23, . . . , the number N is 7, 14, 28, 56, 112, 224, . . . , respectively, wherein the binary signal of eight bits (t0 to t7) out of the n bits are allocated to the three digits of 7-ary signals (S1, S2, S7) so as to substantially minimize the average error rate of the respective bits of the eight-bit binary signal against the totality of errors with the Lee distance of 1 of the three-bit 7-ary signals.

A seventh embodiment of the present invention is directed to an N-ary modulation method in which a binary signal, a bit length thereof being n, is associated with N-ary signals arranged in four phase planes, N being not a number belonging to powers of 2, such as 4, 16, 64, 256, . . . , but being a number such as 28, 56, 112, 224, . . . , and n being such that, when n is 14, 17, 20, 23, . . . , the number N is 28, 56, 112, 224, . . . , respectively, wherein the binary signal of eight bits out of the n bits is converted into three digits of 7-ary signals and the three digits of 7-ary signals are mapped with 90° rotational symmetry of 90° to the first, second, third and fourth phase planes. As a modification of the seventh embodiment of the present invention, the three digits of 7-ary signals may be mapped with axial symmetry to the first, second, third and fourth phase planes. As a modification of the seventh embodiment of the present invention, the three digits of 7-ary signals may be mapped with axial symmetry to the first, second and third phase planes.

In the seventh embodiment of the present invention, two out of the above n bits are allocated for identifying the four quadrants of the first phase plane, two out of the remaining (n−2) bits are allocated for identifying the four quadrants of the second phase plane, and two out of the remaining (n−4) bits are allocated for identifying the four quadrants of the third phase plane.

An eighth embodiment of the present invention is directed to an N-ary modulation method in which a binary signal, a bit length thereof being n, is associated with N-ary signals arranged in four phase planes, N being not a number belonging to powers of 2, such as 4, 16, 64, 256, . . . , but being a number such as 11, 22, 44, 88, 176, 352, and n being such that, if the bit length n is 10, 13, 16, 19, 22, 25, . . . , the number N is 11, 22, 44, 88, 176, 352, . . . , respectively, wherein the binary signal of ten bits (t0 to t9) out of the n bits are allocated to the three digits of 11-ary signals (C1, C2, C3) so as to substantially minimize the average error rate of the respective bits of the ten-bit binary signal against the totality of errors with the Lee distance of 1 of the three digits of 11-ary signals.

A ninth embodiment of the present invention is directed to an N-ary modulation method in which a binary signal, a bit length thereof being n, is associated with N-ary signals arranged in four phase planes, N being not a number belonging to powers of 2, such as 4, 16, 64, 256, . . . , but being a number such as 28, 56, 112, 224, . . . , and n being such that, if the bit length n is 14, 17, 20, 23, . . . , the number N is 28, 56, 112, 224, . . . , respectively, wherein the binary signal of ten bits out of the n bits is converted into three digits of 11-ary signals and the three digits of 11-ary signals are mapped with 90° rotational symmetry of 90° to the first, second and third phase planes. As a modification of the ninth embodiment of the present invention, the 11-ary signals may be mapped with axial symmetry to the first, second, and third phase planes.

In the ninth embodiment of the present invention, two out of the above n bits are allocated for identifying the four quadrants of the first phase plane, two out of the remaining (n−2) bits are allocated for identifying the four quadrants of the second phase plane, and two out of the remaining (n−4) bits are allocated for identifying the four quadrants of the third phase plane.

A tenth embodiment of the present invention is directed to an N-ary modulation method in which a binary signal, a bit length thereof being n, is associated with N-ary signals arranged in four phase planes, N being not a number belonging to powers of 2, such as 4, 16, 64, 256, . . . , but being a number such as 15, 30, 60, 120, 240, 480, . . . , and n being such that, if the bit length n is 15, 19, 23, 27, 31, 35, . . . , the number N is 15, 30, 60, 120, 240, 480, . . . , respectively, wherein he binary signal of eight bits (t0 to t7) out of the n bits are allocated to the three digits of 7-ary signals (S1, S2, S7) so as to substantially minimize the average error rate of the respective bits of the eight-bit binary signal against the totality of errors with the Lee distance of 1 of the three digits of 7-ary signals.

An eleventh embodiment of the present invention is directed to an N-ary modulation method in which a binary signal, a bit length thereof being n, is associated with N-ary signals arranged in four phase planes, N being not a number belonging to powers of 2, such as 4, 16, 64, 256, . . . , but being a number such as 60, 120, 240, 480, . . . , and n being such that, if the bit length n is 23, 27, 31, 35, . . . , the number N is 60, 120, 240, 480, . . . , respectively, wherein the binary signal of eight bits out of the n bits is converted into four digits of 15-ary signals and the four digits of 15-ary signals are mapped with rotational symmetry of 90° to the first, second, third and fourth phase planes. As a modification of the seventh embodiment of the present invention, the three digits of 7-ary signals may be mapped with axial symmetry to the first, second, third and fourth phase planes. As a modification of the eleventh embodiment of the present invention, the 15-ary signals may be mapped with axial symmetry to the first, second and third phase planes.

In the eleventh embodiment of the present invention, two out of the above n bits are allocated for identifying the four quadrants of the first phase plane, two out of the remaining (n−2) bits are allocated for identifying the four quadrants of the second phase plane, and two out of the remaining (n−4) bits are allocated for identifying the four quadrants of the third phase plane.

Although the present invention has been explained with reference to the preferred embodiments thereof, the present invention is not limited to the configuration of the above embodiments described, and may comprise various changes or corrections that may be envisaged by those skimmed in the art within the scope of the invention as defined in the claims.

It should be noted that other objects, features and aspects of the present invention will become apparent in the entire disclosure and that modifications from the disclosed embodiments may be done without departing the scope of the present invention claimed as appended herewith.

Also it should be noted that any combination of the disclosed and/or claimed elements, matters and/or items may fall under the modifications aforementioned.

What is claimed is:

1. An N-ary modulation method comprising the step of associating a binary signal, a bit length thereof being n, with N-ary signals arranged in first and second phase planes respectively for transmission, wherein N is not a number belonging to powers of 2 but is a number belonging to a series beginning from 3 and sequentially doubled, that is, any one of 3, 6, 12, 24, 48, 96, . . . , and wherein n is such that, if the bit length n is 3, 5, 7, 9, 11, 13, . . . , the number N is 3, 6, 12, 24, 48, 96, . . . , respectively, said method further comprising the step of associating, by an N-ary modulation system, in allocating three bits, out of said n bits, of said binary signal to two digits of ternary signals, said three-bit binary signal with said two digits of ternary signals, so as to substantially minimize the average error rate of respective bits of the three-bit binary signal against all errors with the Lee distance of 1 of said two digits of ternary signals.

2. An N-ary modulation method in which a binary signal, a bit length thereof being n, is associated with N-ary signals arranged in first and second phase planes respectively for transmission, wherein N is not a number belonging to powers of 2 but is a number belonging to a series beginning from 12 and sequentially doubled, that is, any one of 12, 24, 48, 96, . . . , and wherein n is such that, if the bit length n is 7, 9, 11, 13, . . . , the number N is 12, 24, 48, 96, . . . , respectively, said method further comprising the steps of:

converting, by an N-ary modulation system, three bits of the binary signal, out of said n bits, into two digits of ternary signals; and mapping said two digits of ternary signals with rotational symmetry of 90° to said first and second phase planes, respectively.

3. An N-ary modulation method in which a binary signal, a bit length thereof being n, is associated with N-ary signals arranged in first and second phase planes respectively for transmission, wherein N is not a number belonging to powers of 2 but is a number belonging to a series beginning from 12 and sequentially doubled, that is, any one of 12, 24, 48, 96, . . . , and wherein n is such that, if the bit length n is 7, 9, 11, 13, . . . , the number N is 12, 24, 48, 96, . . . , respectively, said method comprising the steps of:

converting, by an N-ary modulation system, three bits of the binary signal, out of said n bits, into two digits of ternary signals; and mapping said two digits of ternary signals with axial symmetry to said first and second phase planes, respectively.

4. The N-ary modulation method according to claim 2, further comprising the steps of:

allocating two bits of said n bits for identifying four quadrants of said first phase plane; and allocating two bits of the remaining (n-2) bits for identifying four quadrants of said second phase plane.

5. An N-ary modulation method comprising the step of associating a binary signal, a bit length thereof being n, with N-ary signals arranged in first and second phase planes respectively for transmission, wherein N is not a number belonging to powers of 2 but is a number belonging to a series beginning from 5 and sequentially doubled, that is, any one of 5, 10, 20, 40, 80, . . . , and wherein n is such that, if the bit length n is 9, 13, 17, 21, 25, . . . , the number N is 5, 10, 20, 40, 80, . . . , respectively, said method further comprising the step of associating, by an N-ary modulation system, in allocating nine bits, out of said n bits, of said binary signal to four digits of 5-ary signals, said nine-bit binary signal with said four digits of 5-ary signals so as to substantially minimize the average error rate of respective bits of nine-bit binary signal against all errors with the Lee distance of 1 of said four digits of 5-ary signals.

6. An N-ary modulation method in which a binary signal, a bit length thereof being n, is associated with N-ary signals arranged in first, second, third and fourth phase planes respectively for transmission, wherein N is not a number belonging to powers of 2 but is a number belonging to a series beginning from 20 and sequentially doubled, that is, any one of 20, 40, 80, 160, . . . , and wherein n is such that, if the bit length n is 17, 21, 25, 29, . . . , the number N is 20, 40, 80, 160, . . . , respectively, said method comprising the steps of:

converting, by an N-ary modulation system, nine bits of the binary signal, out of said n bits, into four digits of 5-ary signals; and mapping said four digits of 5-ary signals with rotational symmetry of 90° to said first to fourth phase planes respectively.

7. An N-ary modulation method in which a binary signal, a bit length thereof being n, is associated with N-ary signals with first, second, third and fourth phase planes respectively for transmission, wherein N is not a number belonging to powers of 2 but is a number belonging to a series beginning from 20 and sequentially doubled, that is, any one of 20, 40, 80, 160, . . . , and wherein n is such that, if the bit length n is 17, 21, 25, 29, . . . ,the number N is 20, 40, 80, 160, . . . , respectively, said method comprising the steps of:

converting, by an N-ary modulation system, nine bits of the binary signal, out of said n bits, into four digits of 5-ary signals; and mapping said four digits of 5-ary signals with axial symmetry to said first to fourth phase planes respectively.

8. The N-ary modulation method according to claim 6, further comprising the steps of:

allocating two of said n bits for identifying four quadrants of said first phase plane;

allocating two of the remaining (n-2) bits for identifying four quadrants of said second phase plane;

allocating two of the remaining (n-4) bits for identifying four quadrants of said third phase plane; and allocating two of the remaining (n-6) bits for identifying four quadrants of said fourth phase plane.

9. An N-ary modulation method comprising the step of associating a binary signal, a bit length thereof being n, with N-ary signals with first, second and third phase planes respectively, wherein N is not a number belonging to powers of 2 but is a number belonging to a series beginning from 7 and sequentially doubled, that is, any one of 7, 14, 28, 56, 112, 224, . . . , and wherein n is such that, if the bit length n is 8, 11, 14, 17, 20, 23, . . . the number N is, 7, 14, 28, 56, 112, 224, . . . , respectively, said method comprising further the step of associating, by an N-ary modulation system, in allocating eight bits, out of said n bits, of said binary signal, to three digits of 7-ary signals, said eight-bit binary signal with said three digits of 7-ary signals, so as to substantially minimize the average error rate of respective bits of eight-bit binary signal against all errors with the Lee distance of 1 of said three digits of 7-ary signals.

10. An N-ary modulation method in which a binary signal, a bit length thereof being n, are transmitted as said signals with a length of n is associated with N-ary signals arranged in first, second and third phase planes respectively, wherein N is not a number belonging to powers of 2 but is a number belonging to a series beginning from 28 and sequentially doubled, that is, any one of 28, 56, 112, 224, ..., and wherein n is such that, if the bit length n is 14, 17, 20, 23, ..., the number N is 28, 56, 112, 224, ..., respectively, said method comprising the step of converting, by an N-ary modulation system, eight bits of the binary signal, out of said n bits, into three digits of 7-ary signals; and mapping said three digits of 7-ary signals with rotational symmetry of 90° to said first, second and third phase planes.

11. An N-ary modulation method in which a binary signal, a bit length thereof being n, is associated with N-ary signals arranged in first, second and third phase planes respectively, wherein N is not a number belonging to powers of 2 but is a number belonging to a series beginning from 28 and sequentially doubled, that is, any one of 28, 56, 112, 224, ..., and wherein n is such that, if the bit length n is 14, 17, 20, 23, ..., the number N is 28, 56, 112, 224, ..., respectively, said method comprising the steps of:

converting, by an N-ary modulation system, eight bits of the binary signal, out of said n bits, into three digits of 7-ary signals; and mapping said three digits of 7-ary signals with axial symmetry to said first, second and third phase planes respectively.

12. The N-ary modulation method according to claim 10, further comprising the steps of:

allocating two of said n bits for identifying four quadrants of said first phase plane;

allocating two of the remaining (n-2) bits for identifying four quadrants of said second phase plane; and allocating two of the remaining (n-4) bits for identifying four quadrants of said third phase plane.

13. An N-ary modulation method comprising the step of associating a binary signal, a bit length thereof being n, with N-ary signals arranged in first, second and third phase planes respectively for transmission, wherein N is not a number belonging to powers of 2 but is a number belonging to a series beginning from 11 and sequentially doubled, that is, any one of 11, 22, 44, 88, 176, 352, ..., and wherein n is such that, if the bit length n is 10, 13, 16, 19, 22, 25, ...,the number N is 11, 22, 44, 88, 176, 352, respectively, said method further comprising the step of associating, by an N-ary modulation system, in allocating ten bits, out of said n bits, of said binary signal to three digits of 11-ary signals, said ten-bit binary signal with said three digits of 11-ary signals so as to substantially minimize the average error rate of respective bits often-bit binary signal against all errors with the Lee distance of 1 of said three digits of 11-ary signals.

14. An N-ary modulation method in which a binary signal, a bit length thereof being n, is associated with N-ary signals arranged in first, second and third phase planes respectively for transmission, wherein N is not a number belonging to powers of 2 but is a number belonging to a series beginning from 44 and sequentially doubled, that is, any one of 44, 88, 176, 352, ..., and wherein n is such that, if the bit length n is 16, 19, 22, 25, ..., the number N is 44, 88, 176, 352, ..., respectively, said method comprising the steps of:

converting, by an N-ary modulation system, ten bits of the binary signal, out of said n bits, into three digits of 11-ary signals; and mapping said three digits of 11-ary signals with rotational symmetry of 90° to said first, second and third phase planes respectively.

15. An N-ary modulation method in which a binary signal, a bit length thereof being n, is associated with N-ary signals arranged in first, second and third phase planes respectively for transmission, wherein N is not a number belonging to powers of 2 but is a number belonging to a series beginning from 44 and sequentially doubled, that is, any one of 44, 88, 176, 352, ..., and wherein n is such that, if the bit length n is 16, 19, 22, 25, ..., the numberN is 44, 88, 176, 352, ..., respectively, said method comprising the steps of:

converting, by an N-ary modulation system, ten bits of the binary signal, out of said n bits, into three digits of 11-ary signals; and mapping said three digits of 11-ary signals with axial symmetry to said first, second and third phase planes.

16. The N-ary modulation method according to claim 14, further comprising the steps of:

allocating two of said n bits for identifying four quadrants of said first phase plane;

allocating two of the remaining (n-2) bits for identifying four quadrants of said second phase plane; and allocating two of the remaining (n-4) bits for identifying four quadrants of said third phase plane.

17. An N-ary modulation method comprising the step of associating a binary signal, a bit length thereof being n, with N-ary signals arranged in first, second, third and fourth phase planes respectively for transmission, wherein N is not a number belonging to powers of 2 but is a number belonging to a series beginning from 15 and sequentially doubled, that is, any one of 15, 30, 60, 120, 240, 480, ..., and wherein n is such that, if the bit length n is 15, 19, 23, 27, 31, 35, ..., the number N is 15, 30, 60, 120, 240, 480, respectively, said method further comprising the step of associating, by an N-ary modulation system, in allocating 15 bits, out of said n bits, of said binary signal to four digits of 15-ary signals, said 15-bit binary signal with said four digits of 15-ary signals, so as to substantially minimize the average error rate of respective bits of 15-bit binary signal against all errors with the Lee distance of 1 of said four digits of 15-ary signals.

18. An N-ary modulation method in which a binary signal, a bit length thereof being n, is associated with N-ary signals arranged in first, second, third and fourth phase planes respectively for transmission, wherein N is not a number belonging to powers of 2 but is a number belonging to a series beginning from 60 and sequentially doubled, that is, any one of 60, 240, 480, ..., and wherein n is such that, if the bit length n is 23, 27, 31, 35, the number N is 60, 120, 240, 480, ..., respectively, said method comprising the steps of:

converting, by an N-ary modulation system, 15 bits of the binary signal, out of said n bits, into four digits of 15-ary signals; and mapping said four digits of 15-ary signals with rotational symmetry of 90° to said first to fourth phase planes respectively.

19. An N-ary modulation method in which a binary signal, a bit length thereof being n, is associated with N-ary signals arranged in first, second, third and fourth phase planes respectively for transmission, wherein N is not a number belonging to powers of 2 but is a number belonging to a series beginning from 60 and sequentially doubled, that is, any one of 60, 120, 240, 480, ..., and wherein n is such that, if the bit length n is 23, 27, 31, 35, the number N is 60, 120, 240, 480, ..., respectively, said method comprising the steps of:

converting, by an N-ary modulation system, 15 bits of the binary signal, out of said n bits, into four digits of 15-ary signals; and mapping said four digits of 15-ary signals with axial symmetry to said first, second and third phase planes respectively.

20. The N-ary modulation method according to claim 18, further comprising the steps of:

allocating two of said n bits for identifying four quadrants of said first phase plane;

allocating two of the remaining (n-2) bits for identifying four quadrants of said second phase plane;

allocating two of the remaining (n-4) bits for identifying four quadrants of said third phase plane; and allocating two of the remaining (n-6) bits for identifying four quadrants of said fourth phase plane.

21. The N-ary modulation method according to claim 1, wherein, in associating three-bit binary signal with two digits of ternary signals, said ternary signals being arranged in four quadrants of each of two phase planes, the three-bit binary signal of (0,0,0), (0,0,1), (0,1,1), (1,1,0), (1,1,1), (0,1,0), (1,0,0) and (1,0,1) are allocated to two digits of ternary signals of (0,0), (0,1), (0,2), (1,0), (1,1), (1,2), (2,0) and (2,1) respectively.

22. The N-ary modulation method according to claim 1, wherein, in place of said three-bit binary signal of (0,0,0), (0,0,1), (0,1,1), (1,1,0), (1,1,1), (0,1,0), (1,0,0) and (1,0,1), the bits of (0,0,0), (0,0,1), (0,1,0), (1,1,0), (1,1,1), (0,1,1), (1,0,0) and (1,0,1), (0,0,0), (0,1,1), (0,0,1), (1,0,0), (1,1,1), (1,0,1), (0,1,0) and (1,1,1) or (0,0,0), (0,1,1), (0,0,1), (1,0,0), (1,1,1), (1,0,1), (1,1,0) and (0,1,0) are allocated.

23. The N-ary modulation method according to claim 1, wherein, in associating three-bit binary signal to two digits of ternary signals, said ternary signals being arranged in four quadrants of each of two phase planes, in allocating the three-bit binary signal to the two digits of ternary signals, that is, (0,0), (0,1), (0,2), (1,0), (1,1), (1,2), (2,0) and (2,1), the totality of the three-bit binary signal (b2, b1, b0) are added by (v2, v1, v0), where v2, v1 and v0are 0 or 1, to give (b2+v2, b1+v1, b0+v0), as three-bit binary signal, which are then allocated to the two digits of ternary signals, or wherein the bits b2, b1 and b0 are interchanged in the bit sequence and allocated in this sequence interchanged state to the two digits of ternary signals.

24. An N-ary modulation system comprising means for associating a binary signal, a bit length thereof being n, with N-ary signals arranged in first and second phase planes respectively for transmission, wherein N is not a number belonging to powers of 2 but is a number belonging to a series beginning from 3 and sequentially doubled, that is, any one of 3, 6, 12, 24, 48, 96, ..., and wherein n is such that, if the bit length n is 3, 5, 7, 9, 11, 13, ...,the number N is 3, 6, 12, 24, 48, 96, ..., respectively, said system further comprising:

converting means for allocating three-bits, out of said n bits, of said binary signal, to two digits of ternary signals;

said converting means associating three-bit binary signal with two digits of ternary signals so as to substantially minimize the average error rate of respective bits of said three-bit binary signal against all errors with the Lee distance of 1 of said two digits of ternary signals respectively.

25. An N-ary modulation system in which a binary signal, a bit length thereof being n, is associated with N-ary signals arranged in first and second phase planes respectively for transmission, wherein N is not a number belonging to powers of 2 but is a number belonging to a series beginning from 12 and sequentially doubled, that is, any one of 12, 24, 48, 96, ..., and wherein n is such that, if the bit length n is 7, 9, 11, 13, ..., the number N is 12, 24, 48, 96, ..., respectively, said system comprising:

means for converting three bits of the binary signal, out of said n bits, into two digits of ternary signals; and means for mapping said two digits of ternary signals with rotational symmetry of 90° to said first and second phase planes respectively.

26. An N-ary modulation system in which a binary signal, a bit length thereof being n, are transmitted as said signals with the length of n are associated, as N-ary signals, with first and second phase planes respectively for transmission, wherein N is not a number belonging to powers of 2 but is a number belonging to a series beginning from 12 and sequentially doubled, that is, any one of 12, 24, 48, 96, ..., and wherein n is such that, if the bit length n is 7, 9, 11, 13, ..., the number N is 12, 24, 48, 96, ..., respectively, said system comprising:

means for converting three bits of the binary signal, out of said n bits, into two digits of ternary signals; and means for mapping said two digits of ternary signals with axial symmetry to said first and second phase planes respectively.

27. The N-ary modulation system according to claim 25, further comprising:

means for allocating two of said n bits for identifying four quadrants of said first phase plane; and means for allocating two of the remaining (n-2) bits for identifying four quadrants of said second phase plane.

28. An N-ary modulation system in which a binary signal, a bit length thereof being n, is associated with N-ary signals arranged in first and second phase planes respectively for transmission, wherein N is not a number belonging to powers of 2 but is a number belonging to a series beginning from 5 and sequentially doubled, that is, any one of 5, 10, 20, 40, 80, ..., and wherein n is such that, if the bit length n is 9, 13, 17, 21, 25, ..., the number N is 10, 20, 40, 80, ..., respectively, said system comprising:

converting means for allocating nine bits, out of said n bits, of said binary signal to four digits of 5-ary signals;

said converting means associating said nine-bit binary signal with said four digits of 5-ary signals, so as to substantially minimize the average error rate of respective bits of nine-bit binary signal against all errors with the Lee distance of 1 of said four digits of 5-ary signals.

29. An N-ary modulation system in which a binary signal, a bit length thereof being n, is associated with N-ary signals arranged in first, second, third and fourth phase planes respectively for transmission, wherein N is not a number belonging to powers of 2 but is a number belonging to a series beginning from 20 and sequentially doubled, that is, any one of 20, 40, 80, 160, ..., and wherein n is such that, if the bit length n is 17, 21, 25, 29, ..., the number N is 20, 40, 80, 160, ..., respectively, said system comprising:

means for converting nine bits of the binary signal, out of said n bits, into four digits of 5-ary signals; and means for mapping said four digits of 5-ary signals with rotational symmetry of 90° to said first to fourth phase planes respectively.

30. An N-ary modulation system in which a binary signal, a bit length thereof being n, is associated with N-ary signals arranged in first, second, third and fourth phase planes respectively for transmission, wherein N is not a number belonging to powers of 2 but is a number belonging to a series beginning from 20 and sequentially doubled, that is, any one of 20, 40, 80, 160, . . . , and wherein n is such that, if the bit length n is 17, 21, 25, 29, . . . ,the number N is 20, 40, 80, 160, . . . , respectively, said system comprising:

means for converting nine bits of the binary signal, out of said n bits, into four digits of 5-ary signals; and means for mapping said four digits of 5-ary signals with axial symmetry to said first to fourth phase planes respectively.

31. The N-ary modulation system according to claim 29, further comprising:

means for allocating two of said n bits for identifying four quadrants of said first phase plane;

means for allocating two of the remaining (n-2) bits for identifying four quadrants of said second phase plane;

means for allocating two of the remaining (n-4) bits for identifying four quadrants of said third phase plane; and means for allocating two of the remaining (n-6) bits for identifying four quadrants of said fourth phase plane.

32. An N-wy modulation system in which a binary signal, a bit length thereof being n, is associated with N-ary signals arranged in first, second and third phase planes respectively for transmission, wherein N is not a number belonging to powers of 2 but is a number belonging to a series beginning from 7 and sequentially doubled, that is, any one of 7, 14, 28, 56, 112, 224, . . . , and wherein n is such that, if the bit length n is 8, 11, 14, 17, 20, 23, . . . , the number N is, 7, 14, 28, 56, 112, 224, . . . , respectively, said system comprising:

converting means for allocating eight bits, out of said n bits, of said binary signal to three digits of 7-ary signals;

said converting means associating eight bits, out of said n bits, of said binary signal, to three digits of 7-ary signals so as to substantially minimize the average error rate of respective bits of eight-bit binary signal against all errors with the Lee distance of 1 of said three digits of 7-ary signals.

33. An N-ary modulation system in which a binary signal, a bit length thereof being n, are transmitted as said signals with the bit length of n are associated as N-ary signals with first, second and third phase planes respectively for transmission, wherein N is not a number belonging to powers of 2 but is a number belonging to a series beginning from 28 and sequentially doubled, that is, any one of 28, 56, 112, 224, . . . , and wherein n is such that, if the bit length n is 14, 17, 20, 23, . . . , the number N is 28, 56, 112, 224, . . . , respectively, said system comprising:

means for converting eight bits of the binary signal, out of said n bits, into three digits of 7-ary signals; and means for mapping said three digits of 7-ary signals with rotational symmetry of 90° to said first, second and third phase planes.

34. An N-ary modulation system in which a binary signal, a bit length thereof being n, is associated with N-ary signals arranged in first, second and third phase planes respectively for transmission, wherein N is not a number belonging to powers of 2but is a number belonging to a series beginning from 28 and sequentially doubled, that is, any one of 28, 56, 112, 224, . . . , and wherein n is such that, if the bit length n is 14, 17, 20, 23, . . . , the number N is 28, 56, 112, 224, . . . , respectively, said system comprising:

means for converting eight bits of the binary signal, out of said n bits, into three digits of 7-ary signals; and means for mapping said three digits of 7-ary signals with axial symmetry to said first, second and third phase planes respectively.

35. The N-ary modulation system according to claim 33, further comprising:

means for allocating two of said n bits for identifying four quadrants of said first phase plane;

means for allocating two of the remaining (n-2) bits for identifying four quadrants of said second phase plane; and means for allocating two of the remaining (n-4) bits for identifying four quadrants of said third phase plane.

36. An N-ary modulation system in which a binary signal, a bit length thereof being n, is associated with N-ary signals arranged in first, second and third phase planes respectively for transmission, wherein N is not a number belonging to powers of 2 but is a number belonging to a series beginning from 11 and sequentially doubled, that is, any one of 11, 22, 44, 88, 176, 352, . . . , and wherein n is such that, if the bit length n is 10, 13, 16, 19, 22, 25, . . . , the number N is 11, 22, 44, 88, 176, 352, . . . , respectively, said system comprising:

converting means for allocating ten bits, out of said n bits, of said binary signal to three digits of 11-ary signals;

said converting means associating ten bits, out of said n bits, of said binary signal to three digits of 11-ary signals, with said three digits of 11-ary signals so as to substantially minimize the average error rate of respective bits of ten-bit binary signal against all errors with the Lee distance of 1 of said three digits of 11-ary signals.

37. An N-ary modulation system in which a binary signal, a bit length thereof being n, is associated with N-ary signals arranged in first, second and third phase planes respectively for transmission, wherein N is not a number belonging to powers of 2but is a number belonging to a series beginning from 44 and sequentially doubled, that is, any one of 44, 88, 176, 352, . . . , and wherein n is such that, if the bit length n is 16, 19, 22, 25, . . . , the number N is 44, 88, 176, 352, . . . , respectively, said system comprising:

means for converting ten bits of the binary signal, out of said n bits, into three digits of 11-ary signals; and means for mapping said three digits of 11-ary signals with 90° rotational symmetry of 90° to said first, second and third phase planes respectively.

38. An N-ary modulation system in which a binary signal, a bit length thereof being n, is associated with N-ary signals arranged in first, second and third phase planes respectively for transmission, wherein N is not a number belonging to powers of 2 but is a number belonging to a series beginning from 44 and sequentially doubled, that is, any one of 44, 88, 176, 352, . . . , and wherein n is such that, if the bit length n is 16, 19, 22, 25, . . . , the number N is 44, 88, 176, 352, . . . , respectively, said system comprising:

means for converting ten bits of the binary signal, out of said n bits, into three digits of 11-ary signals; and means for mapping said three digits of 11-ary signals with axial symmetry to said first, second and third phase planes respectively.

39. The N-ary modulation system according to claim 37, further comprising:

means for allocating two of said n bits for identifying four quadrants of said first phase plane;

means for allocating two of the remaining (n-2) bits for identifying four quadrants of said second phase plane; and means for allocating two of the remaining (n-4) bits for identifying four quadrants of said third phase plane.

40. An N-ary modulation system comprising means for associating a binary signal, a bit length thereof being n, with N-ary signals arranged in first, second, third and fourth phase planes respectively for transmission, wherein N is not a number belonging to powers of 2 but is a number belonging to a series beginning from 15 and sequentially doubled, that is, any one of 15, 30, 60, 120, 240, 480, . . . , and wherein n is such that, if the bit length n is 15, 19, 23, 27, 31, 35, . . . ,the number N is 15, 30, 60, 120, 240, 480, . . . , respectively, said system further comprising:

converting means for allocating 15 bits, out of said n bits, of said binary signal to four digits of 15-ary signals;

said converting means associating the 15 bits, out of said n bits, of said binary signal to four digits of 15-ary signals, so as to substantially minimize the average error rate of respective bits of 15-bit binary signal against all errors with the Lee distance of 1 of said four digits of 15-ary signals.

41. An N-ary modulation system in which a binary signal, a bit length thereof being n, is associated with N-ary signals arranged in first, second, third and fourth phase planes respectively for transmission, wherein N is not a number belonging to powers of 2 but is a number belonging to a series beginning from 60 and sequentially doubled, that is, any one of 60, 120, 240, 480, . . . , and wherein n is such that, if the bit length n is 23, 27, 31, 35, . . . , the number N is 60, 120, 240, 480, . . . , respectively, said system comprising:

means for converting 15 bits of the binary signal, out of said n bits, into four digits of 15-ary signals; and means for mapping said four digits of 15-ary signals with 90° rotational symmetry to said first to fourth phase planes.

42. An N-ary modulation system in which a binary signal, a bit length thereof being n, is associated with N-ary signals arranged in first, second, third and fourth phase planes respectively for transmission, wherein N is not a number belonging to powers of 2 but is a number belonging to a series beginning from 60 and sequentially doubled, that is, any one of 60, 120, 240, 480, . . . , and wherein n is such that, if the bit length n is 23, 27, 31, 35, . . . , the number N is 60, 120, 240, 480, . . . , respectively, said system comprising:

means for converting 15 bits of the binary signal, out of said n bits, into four digits of 15-ary signals; and means for mapping said four digits of 15-ary signals with axial symmetry to said first, second and third phase planes.

43. The N-ary modulation system according to claim 41, further comprising:

means for allocating two of said n bits for identifying four quadrants of said first phase plane;

means for allocating two of the remaining (n-2) bits for identifying four quadrants of said second phase plane;

means for allocating two of the remaining (n-4) bits for identifying four quadrants of said third phase plane; and means for allocating two of the remaining (n-6) bits for identifying four quadrants of said fourth phase plane.

44. The N-ary modulation system according to claim 24, wherein, in associating three-bit binary signal to two digits of ternary signals, arranged in four quadrants of each of two phase planes, the three-bit binary signal of (0,0,0), (0,0,1), (0,1,1), (1,1,0), (1,1,1), (0,1,0), (1,0,0) and (1,0,1) are allocated to two digits of ternary signals of(0,0), (0,1), (0,2), (1,0), (1,1), (1,2), (2,0) and (2,1).

45. The N-ary modulation system according to claim 24, wherein, in place of said three-bit binary signal of (0,0,0), (0,0,1), (0,1,1), (1,1,0), (1,1,1), (0,1,0), (1,0,0) and (1,0,1), the bits of (0,0,0), (0,0,1), (0,1,0), (1,1,0), (1,1,1), (0,1,1), (1,0,0) and (1,0,1), (0,0,0), (0,1,1), (0,0,1), (1,0,0), (1,1,1), (1,0,1), (0,1,0) and (1,1,1) or (0,0,0), (0,1,1), (0,0,1), (1,0,0), (1,1,1), (1,0,1), (1,1,0) and (0,1,0) are allocated.

46. The N-ary modulation system according to claim 24, wherein, in associating three-bit binary signal to two digits of ternary signals, arranged in four quadrants of each of two phase planes, more specifically, in allocating the three-bit binary signal to the two digits of ternary signals, that is, (0,0), (0,1), (0,2), (1,0), (1,1), (1,2), (2,0) and (2,1), the totality of the three-bit binary signal (b2, b1, b0) are added by (v2, v1, v0), where v2, v1 and v0 are 0 or 1, to give (b2+v2, b1+v1, b0+v0), as three-bit binary signal, which are then allocated to the two digits of ternary signals, or wherein the bits b2, b1 and b0 are interchanged in the bit sequence and allocated in this sequence interchanged state to the two digits of ternary signals.

47. A modulation method comprising the steps of:

inputting a three-bit binary signal, forming at least a portion of a bit string of input digital signals;

converting, said three-bit binary signal into two digits of ternary signals;

arranging said two digits of ternary signals in the quadrants of each of two phase planes;

mapping said two digits of ternary signals with rotational symmetry therein; and allocating the three-bit binary signal and the two digits of ternary signals such as to minimize the average error rate of respective bits of the three-bit binary signal against all errors with the distance 1 of said ternary signals.

48. A modulation method comprising the steps of:

inputting a three-bit binary signal, forming at least a portion of a bit string of input digital signals;

converting, said three-bit binary signal into two digits of ternary signals;

arranging said two digits of ternary signals in the quadrants of each of two phase planes;

mapping said two digits of ternary signals with axial symmetry therein; and allocating the three-bit binary signal and the two digits of ternary signals such as to minimize the average error rate of respective bits of the three-bit binary signal against all errors with the distance 1 of said ternary signals.

49. A modulation apparatus comprising:

a conversion circuit receiving a three-bit binary signal, forming at least a portion of a bit string of input digital signals, and converting said three-bit binary signal into two digits of ternary signals;

an arranging circuit arranging said two digits of ternary signals in the quadrants of each of two phase planes and mapping said two digits of ternary signals with rotational symmetry therein; and an allocating circuit allocating the three-bit binary signal and the two digits of ternary signals such as to minimize the average error rate of respective bits of the three-bit binary signal against all errors with the distance 1 of said ternary signals.

50. A modulation apparatus comprising:

a converting circuit receiving a three-bit binary signal, forming at least a portion of a bit string of input digital signals, and converting said three-bit binary signal into two digits of ternary signals;

an arranging circuit arranging said two digits of ternary signals in the quadrants of each of two phase planes and mapping said two digits of ternary signals with axial symmetry therein; and an allocating circuit allocating the three-bit binary signal and the two digits of ternary signals such as to minimize the average error rate of respective bits of the three-bit binary signal against all errors with the distance 1 of said ternary signals.

51. A demodulation apparatus receiving modulated signals from a modulation apparatus as defined in claim 49 over a transmission channel to demodulate and output received signals.

52. The N-ary modulation method according to claim 3, further comprising the steps of:

allocating two bits of said n bits for identifying four quadrants of said first phase plane; and allocating two bits of the remaining (n-2) bits for identifying four quadrants of said second phase plane.

53. The N-ary modulation method according to claim 7, further comprising the steps of:

allocating two of said n bits for identifying four quadrants of said first phase plane;

allocating two of the remaining (n-2) bits for identifying four quadrants of said second phase plane;

allocating two of the remaining (n-4) bits for identifying four quadrants of said third phase plane; and allocating two of the remaining (n-6) bits for identifying four quadrants of said fourth phase plane.

54. The N-ary modulation method according to claim 11, further comprising the steps of:

allocating two of said n bits for identifying four quadrants of said first phase plane;

allocating two of the remaining (n-2) bits for identifying four quadrants of said second phase plane; and allocating two of the remaining (n-4) bits for identifying four quadrants of said third phase plane.

55. The N-ary modulation method according to claim 15, further comprising the steps of:

allocating two of said n bits for identifying four quadrants of said first phase plane;

allocating two of the remaining (n-2) bits for identifying four quadrants of said second phase plane; and allocating two of the remaining (n-4) bits for identifying four quadrants of said third phase plane.

56. The N-ary modulation method according to claim 19, further comprising the steps of:

allocating two of said n bits for identifying four quadrants of said first phase plane;

allocating two of the remaining (n-2) bits for identifying four quadrants of said second phase plane;

allocating two of the remaining (n-4) bits for identifying four quadrants of said third phase plane; and allocating two of the remaining (n-6) bits for identifying four quadrants of said fourth phase plane.

57. The N-ary modulation system according to claim 26, further comprising:

means for allocating two of said n bits for identifying four quadrants of said first phase plane; and means for allocating two of the remaining (n-2) bits for identifying four quadrants of said second phase plane.

58. The N-ary modulation system according to claim 30, further comprising:

means for allocating two of said n bits for identifying four quadrants of said first phase plane;

means for allocating two of the remaining (n-2) bits for identifying four quadrants of said second phase plane;

means for allocating two of the remaining (n-4) bits for identifying four quadrants of said third phase plane; and means for allocating two of the remaining (n-6) bits for identifying four quadrants of said fourth phase plane.

59. The N-ary modulation system according to claim 34, further comprising:

means for allocating two of said n bits for identifying four quadrants of said first phase plane;

means for allocating two of the remaining (n-2) bits for identifying four quadrants of said second phase plane; and means for allocating two of the remaining (n-4) bits for identifying four quadrants of said third phase plane.

60. The N-ary modulation system according to claim 38, further comprising:

means for allocating two of said n bits for identifying four quadrants of said first phase plane;

means for allocating two of the remaining (n-2) bits for identifying four quadrants of said second phase plane; and means for allocating two of the remaining (n-4) bits for identifying four quadrants of said third phase plane.

61. The N-ary modulation system according to claim 42, further comprising:

means for allocating two of said n bits for identifying four quadrants of said first phase plane;

means for allocating two of the remaining (n-2) bits for identifying four quadrants of said second phase plane;

means for allocating two of the remaining (n-4) bits for identifying four quadrants of said third phase plane; and means for allocating two of the remaining (n-6) bits for identifying four quadrants of said fourth phase plane.

* * * * *